United States Patent
Smith et al.

(10) Patent No.: US 6,827,141 B2
(45) Date of Patent: Dec. 7, 2004

(54) VEHICLE HEATING AND AIR CONDITIONING MODULES

(75) Inventors: Kenneth J. Smith, Yoder, IN (US); Carl B. Dalkert, Fort Wayne, IN (US); Michelle R. Gehres, Convoy, OH (US); Gregory J. Kolodziej, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 77 days.

(21) Appl. No.: 10/079,738

(22) Filed: Feb. 21, 2002

(65) Prior Publication Data

US 2002/0117296 A1 Aug. 29, 2002

Related U.S. Application Data

(60) Provisional application No. 60/271,084, filed on Feb. 23, 2001.

(51) Int. Cl.[7] .................. B60H 1/00; B60H 1/32; B62D 65/00; F25B 29/00
(52) U.S. Cl. .................. 165/202; 165/42; 165/43; 165/72; 165/75; 165/78; 454/156; 62/244; 62/272; 237/12.3 A; 237/12.3 B
(58) Field of Search .................. 165/202, 42, 43, 165/11.1, 78, 72, 75; 454/156; 237/12.3 A, 12.3 B; 62/244, 272

(56) References Cited

U.S. PATENT DOCUMENTS

| | | | |
|---|---|---|---|
| 3,170,509 A | * | 2/1965 | De Rees |
| 3,263,739 A | * | 8/1966 | Gaskill |
| 3,718,281 A | * | 2/1973 | Beatenbough |
| 3,731,729 A | * | 5/1973 | Beatenbough |
| 3,896,872 A | * | 7/1975 | Pabst |
| 3,897,526 A | * | 7/1975 | Morse |

(List continued on next page.)

FOREIGN PATENT DOCUMENTS

| | | | |
|---|---|---|---|
| CA | 2199687 | * | 1/1998 |
| DE | 37 38425 | * | 5/1989 |

(List continued on next page.)

OTHER PUBLICATIONS

2001–026209 Derwent Abstract and one drawing (Jan. 30, 2001).*

Photographs of Peterbilt Model P–387 purchased Jan. 31, 2000.

*Primary Examiner*—John K. Ford
(74) *Attorney, Agent, or Firm*—Jeffrey P. Calfa; Dennis Kelly Sullivan; Susan L. Lukasik

(57) ABSTRACT

A heating, ventilation and air conditioning system for a vehicle is constructed from two modules, one for the engine compartment and a second for the passenger compartment. The engine compartment module has a base formed for positioning on at least two locations on a dash panel, a outside air inlet, a secondary air inlet for communication with the passenger compartment, an air outlet and defining a air transport conduit connecting the outside air inlet or the secondary air inlet with the air outlet. Downstream from the engine compartment is a passenger compartment module having a slide slot for a heater core, an inlet for communication with the air outlet from the engine compartment module, an air manifold, a panel exhaust from the air manifold, a defrost exhaust from the air manifold, a compartment door providing access to the slide in friction slot, and an air channel from the inlet to the air manifold. The heater core is positioned in the slide in slot.

8 Claims, 10 Drawing Sheets

U.S. PATENT DOCUMENTS

| | | | | |
|---|---|---|---|---|
| 4,319,519 A | * | 3/1982 | Parsson |
| 4,353,430 A | | 10/1982 | Sjöqvist et al. |
| 4,383,642 A | * | 5/1983 | Sumikawa |
| 4,485,863 A | * | 12/1984 | Yoshida |
| 4,519,302 A | * | 5/1985 | Nilsson et al. |
| 4,871,954 A | * | 10/1989 | Rathgeber |
| 4,956,979 A | * | 9/1990 | Burst |
| 4,989,412 A | * | 2/1991 | Johnson |
| 5,219,017 A | * | 6/1993 | Halstead et al. |
| 5,481,885 A | * | 1/1996 | Xavier et al. |
| 5,517,101 A | * | 5/1996 | Sakai et al. |
| 5,545,085 A | | 8/1996 | Danieau |
| 5,836,380 A | | 11/1998 | Takesita et al. |
| 5,939,853 A | * | 8/1999 | Masauji et al. |

FOREIGN PATENT DOCUMENTS

| | | | |
|---|---|---|---|
| DE | 4123949 | * | 1/1993 |
| DE | 196 51 669 C | | 12/1997 |
| EP | 0983884 | * | 3/2000 |
| FR | 2 742 383 A | | 6/1997 |
| FR | 2 754 492 A | | 4/1998 |
| JP | 62-137215 | * | 6/1987 |
| JP | 63-215416 | * | 9/1988 |
| JP | 4-208627 | * | 7/1992 |
| JP | 7-9841 | * | 1/1995 |
| JP | 8-268037 | * | 10/1996 |
| JP | 10-226217 | * | 8/1998 |
| JP | 11-18491 | * | 1/1999 |

\* cited by examiner

VEHICLE HEATING AND AIR CONDITIONING MODULES

CROSS REFERENCE TO RELATED APPLICATION

The present application is related to provisional application No. 60/271,084 filed Feb. 23, 2001.

BACKGROUND OF THE INVENTION

1. Field of the Invention

The present invention relates to motor vehicle cabin climate control and more particularly to interoperative, easily maintained cabin and engine compartment modules, which are used to implement cabin heating and cooling in an efficient and reliable manner.

2. Description of the Problem

Combined systems for heating, ventilation and air conditioning (HVAC) have become an industry norm for automobiles and trucks. Among the features common to most if not all such systems are, a heater core, a blower to force air through the heater core, an evaporator for cooling air, distribution duct work, and a plurality of flow directing doors controlling the source of intake air, the route of the air through the system and the distribution points of the air into the cabin. The construction, arrangement, packaging and control of these elements has a number of ramifications for unit efficiency, cost and ease of manufacture and maintenance, space requirements for installation and passenger comfort.

Passenger cabin heating and windshield defrosting is provided by forcing air through interstices in a heater core, which, in vehicles with liquid cooled engines, use circulating engine coolant as a source of heat. Contemporary HVAC systems often provide no cutoff valve for interrupting coolant circulation through the core, Instead, internal air flow control doors cut off the core from air circulation when heat is not desired. Coolant cutoff valves have proven relatively unreliable in many applications, and eliminating them has produced maintenance savings. Heater cores themselves are an occasional maintenance problem, being prone to corrosion and leakage with long term use, The positioning and manner of installation of heater cores has made them difficult to replace.

Combined heating, ventilation and cooling systems have been adopted to reduce the costs of duct work, since only one set of distribution channels is required. Such an arrangement, combined with the absence of a heater core cutoff valve, contributes to greater complexity in the arrangements for air flow control. Rapid cooling of the vehicle passenger compartment when a vehicle is first turned on is often achieved by recirculating cabin air rather than drawing in outside air. Some defogging regimens call for both cooling the air, to remove moisture, and heating the air to clear interior surfaces of the vehicle greenhouse. Flow control doors must be positionable to draw air from either outside or inside the passenger compartment, to direct air through either or both the heater core and the evaporator and then to mix the air before it is directed against the glass. Finally, vent doors must provide for distribution of air to the desired locations. Kinematic positioning movements control the position of various vent and flow control doors and to deliver adequate air flow to the desired zone.

Individual products of the motor vehicle industry are frequently sold world wide. What were once considered North American trucks have found markets in South America, Australia and South Africa, among other places. Australia and South Africa use right hand drive vehicles and an HVAC system intended for a vehicle to be sold in both left hand and right hand drive countries can cost less in tooling if the components fit either type of vehicle.

SUMMARY OF THE INVENTION

According to the invention there is provided a heating, ventilation and air conditioning system for a vehicle. The system includes an engine compartment module having a base formed for positioning on at least two locations on a dash panel, an outside air inlet, a secondary air inlet for communication with the passenger compartment, an air outlet and defining an air transport conduit connecting the outside air inlet or the secondary air inlet with the air outlet. Downstream from the engine compartment, on the opposite major surface of the dash panel, is a passenger compartment module having a slide in slot for a heater core, an inlet for communication with the air outlet from the engine compartment module, an air manifold, a panel exhaust from the air manifold, a defrost exhaust from the air manifold, a compartment door providing access to the slide in friction slot, and an air channel from the inlet to the air manifold. A heater core is positioned in the slide in slot. A temperature blend door is positioned in the air channel on a pivoting mount allowing movement of the temperature blend door to various positions controlling the proportion of air flow through the air channel diverted through the heater core. A pulse count actuator is coupled to the temperature blend door for positioning the temperature blend door. A vent door is mounted on a pivoting mount and positionable in the air manifold for diverting air flow through the panel exhaust. A defrost door is mounted on a second pivoting mount and positionable in the air manifold for diverting air flow through the defrost exhaust. A kinematic movement including a pulse count actuator provides for positioning the vent and defrost doors. A blower is situated along the air channel of the passenger compartment module upstream from the slide in friction slot. An evaporator is mounted in the engine compartment module.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
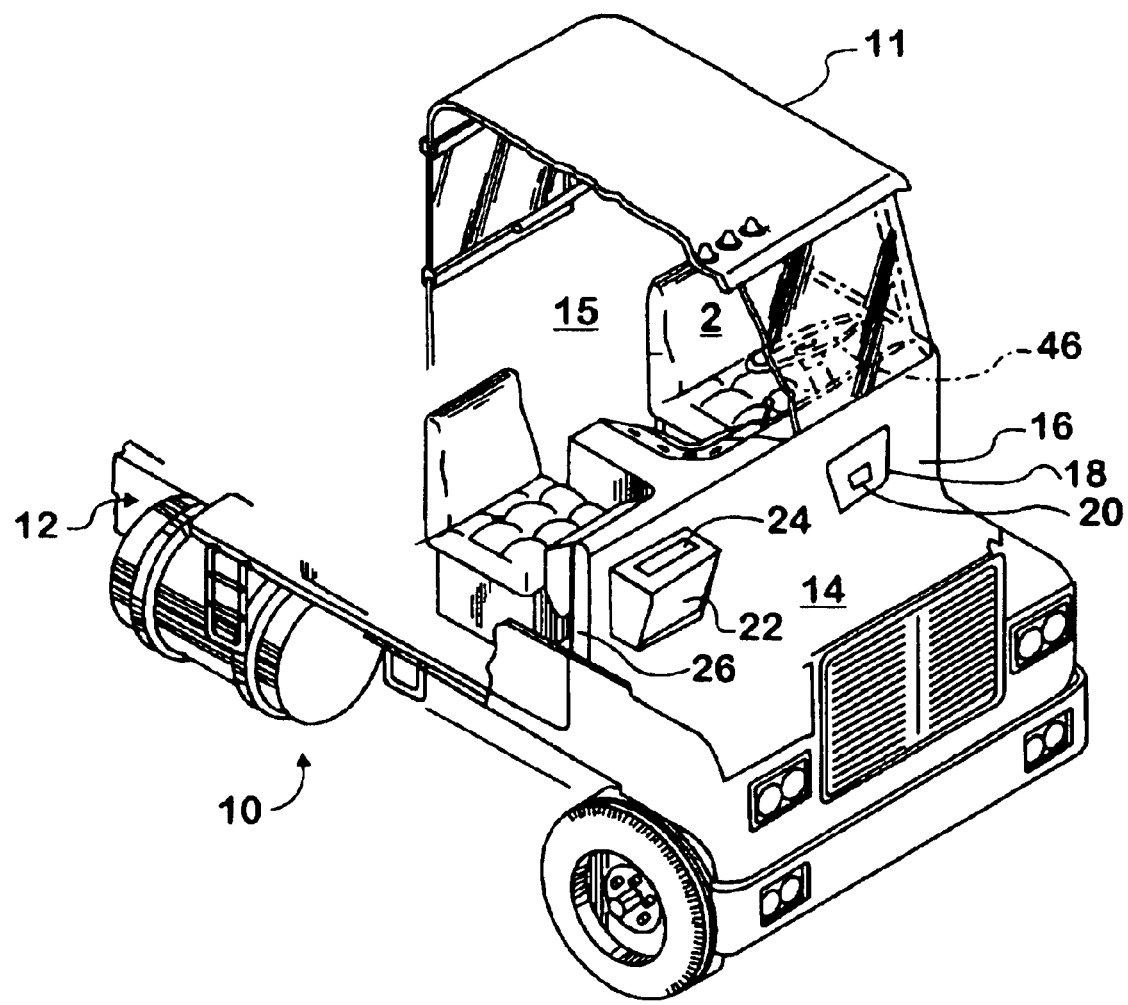
FIG. 1 is a perspective view of a truck on which the heating, ventilation and air conditioning system of the invention is installed.

Referring now to the figures and particularly to FIG. 1, a truck 10 is shown on which the heating, ventilation and air conditioning system of the invention is advantageously installed. Truck 10 comprises a cab 11 which rests on a frame 12. An engine compartment 14 is separated from a passenger compartment 15 by a dash panel 16. Dash panel 16 includes a pair of mating positions 18 toward each side of the truck 10, one being visible on the driver's side 42 of truck 10. A second position is hidden from view behind an engine compartment module 22. Mating positions 18 include openings 20 through the dash panel 16 through which a steering column 46 may pass or which may be used as an channel to direct air through.

An evaporator or engine compartment module 22 is mounted over the mating position 18 not required for steering column 46, i.e. on the side opposite to the drivers side 42 of the vehicle, Engine compartment module 22 includes an air intake 24 and is positioned on the dash wall 16 adjacent to, but extending from the opposite major face of dash panel 16.

Figure 2:
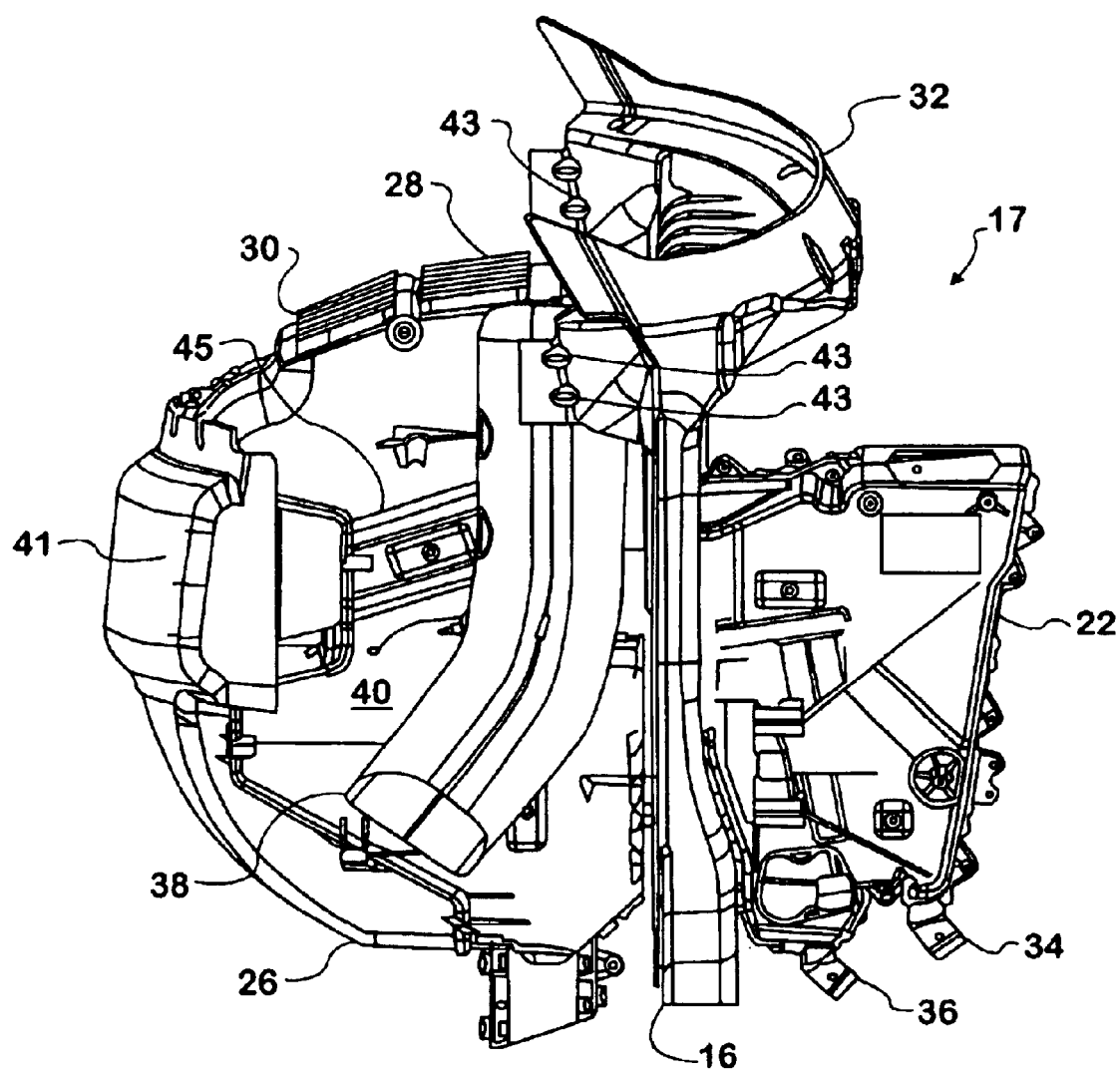
FIG. 2 is a side elevation of the heating, ventilation and air conditioning system installation in accordance with a preferred embodiment of the invention.

Referring now to FIG. 2, a heating, ventilation and air conditioning (HVAC) system 17 for a motor vehicle is shown. HVAC system 17 comprises two major modules, an engine compartment module 22, which includes an evaporator for air cooling, and a passenger compartment module 26 which has a heater core for heating air, Both modules are supported on dash panel 16, one on each of the opposed major surfaces of the dash panel. Modules 22 and 26 communicate with each other by way of openings through the dash panel 16. Extending from the bottom of engine compartment module 22 are two drains, a precipitation drain 34 and a condensate drain 36.

Passenger compartment module 26 includes a coolant drain 60 (See FIG. 4), providing an escape for coolant loss from a leaking heater core. A panel vent 30 and a defrost vent 28 are located adjacent one another along the top of passenger compartment module 26. A conduit 38 distributes air to the floor from a manifold internal to module 26. Panel 41 is attached to module 26 by conventional fasteners and is removable to provide ready access to the interior of module 26 for repairs, particularly replacement of a heater core or a blower, The heater core is located under a end fitting region 45 in panel 40 which helps locate the heater core firmly within module 26.

Figure 3:
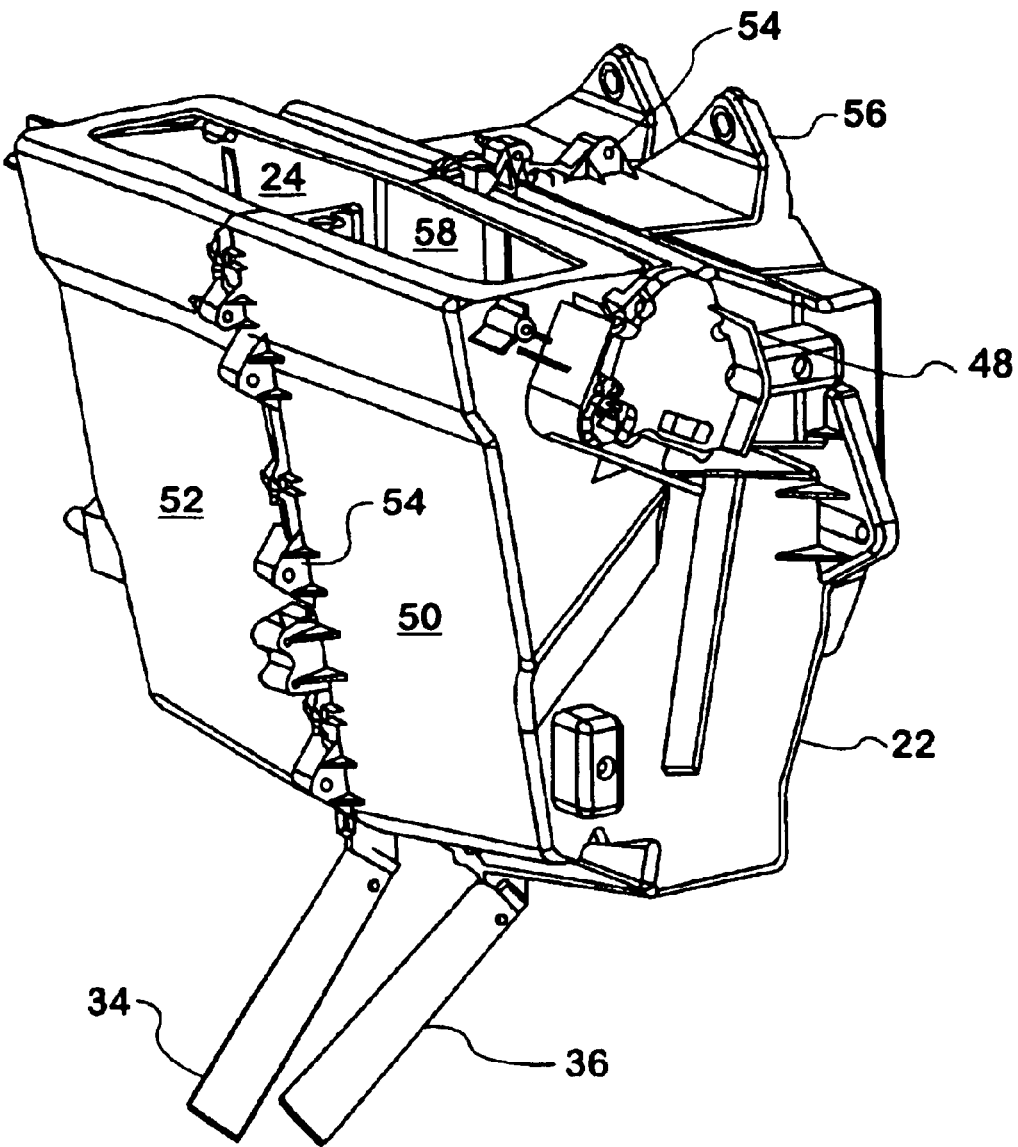
FIG. 3 is a perspective view of an evaporator or engine compartment module of the preferred embodiment.

Referring now to FIG. 3, engine compartment module 22 is illustrated in greater detail. Engine compartment 22 is constructed from two half sections 50 and 52, which are attached to one another along a series of projecting flanges 54 by conventional fasteners. Similar flanges 56 extend from a back edge of the module allowing attachment of the module to the dash panel. A recirculation control door 58 is located inside of module 22 visible through outside air inlet 24. A pulse actuator 48, hung from the outside of the module, controls the position of recirculation control door 58, which can be rotated to close inlet 24.

Figure 4:
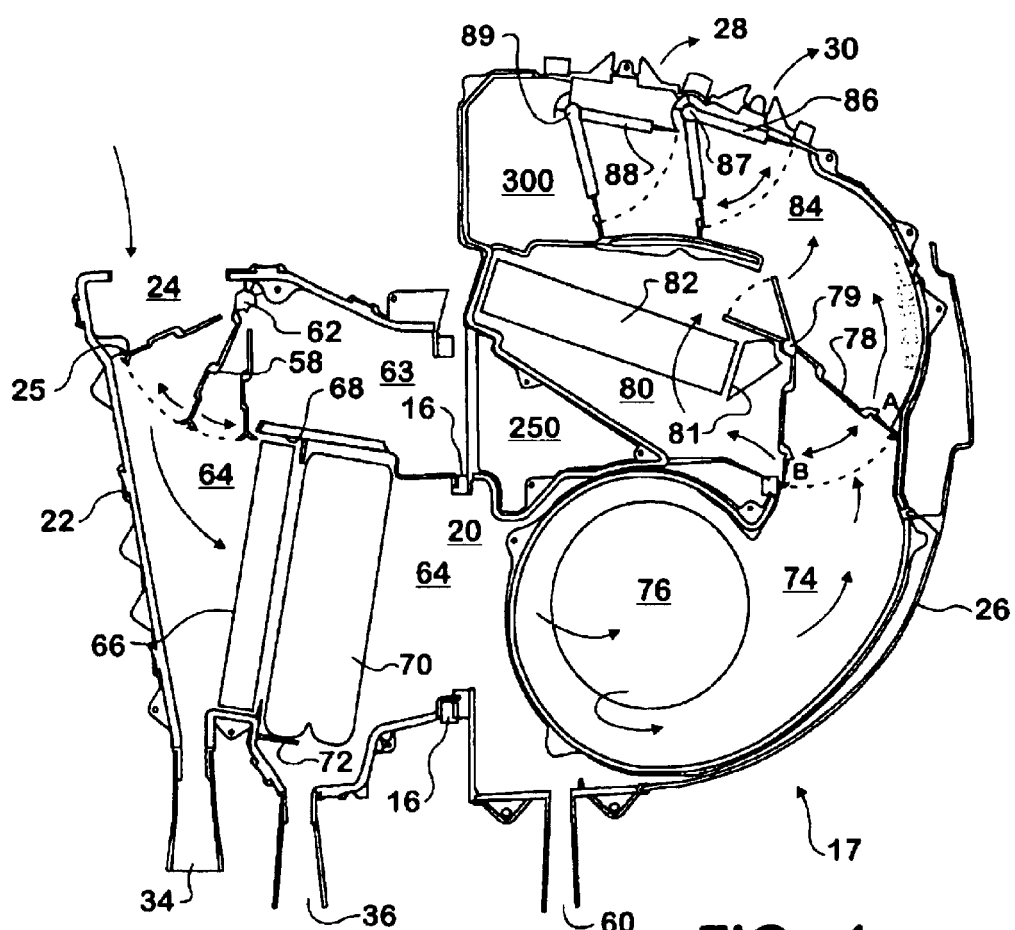
FIG. 4 is a schematic view of the heating, ventilation and air conditioning system of the preferred embodiment.

Referring now to FIG. 4, the major internal elements of HVAC system 17 are shown in a schematic view, which also illustrates by a series of arrows the flow of air through the system. Outside air enters HVAC system 17 by an outside air inlet 24, provided recirculation control door 58 is positioned away from the inlet. Recirculation control door 58 is mounted on a rotatable axle 62, allowing the door to be moved between positions fully closing inlet 24, door 58 moved upwardly against stop 25, and a position with door 58 fully retracted from inlet 24 allowing outside air to enter the system freely. When door 58 is in the closed position air is recirculated from the passenger cabin manifold 84 and channels 63 and 250.

Through inlet 24 air enters a channel 64 from which there are two drains, a precipitation drain located ahead of filter 66 and evaporator 70, and a condensation drain 36, which is downstream in the air path from the evaporator. Filter 66 and evaporator 70 are mounted in frames 68 and 72, respectively. From evaporator 70 air is drawn further down channel 64 to a blower 76, which includes a D.C. motor and a centrifugal fan, the details of which are conventional. Blower 76 pushes air out along a heater module 26 air channel 74, which passes next to a heater core plenum 80. Air may be directed through or by plenum 80 by the position of a temperature blend control door 78, which is pivotally 79 mounted along channel 74 and which may be moved between positions A and B at which positions it closes channel 74 and access to plenum 80, respectively.

With temperature blend door 78 positioned at position A, and air flow thereby diverted through plenum 80, the flowing air encounters and passes through heater core 82 before returning to channel 74 on the downstream side of door 78. Heater core 82 typically will not have a shut off valve, and accordingly, coolant from an engine will, if the vehicle is on, be flowing through the core. Normally the air will draw heat from heater core 82, which is functions as a heat exchanger. When module 26 is opened or partially disassembled, heater core 82 may be slid into and out of a slot 81, allowing ready replacement of the core if required. Door 78 extends from sides of pivot mount 79, and when positioned as indicated by the letter B, it closes off plenum 80 on both sides, preventing air from contacting heater core 82.

Downstream from plenum 80 is located an air distribution manifold 84. Air may be discharged from manifold 84 through a panel vent 30, a defrost vent 28, or to floor vents by channel 300. The direction of air is set by two ventilation control doors, a panel vent door 86 located upstream from defrost vent door 88. Doors 86 and 88 are mounted on rotatable axes 87 and 89, respectively. Doors 86 and 88 may be positioned to direct air into channel 300 for distribution to the floor conduits.

Figure 5:
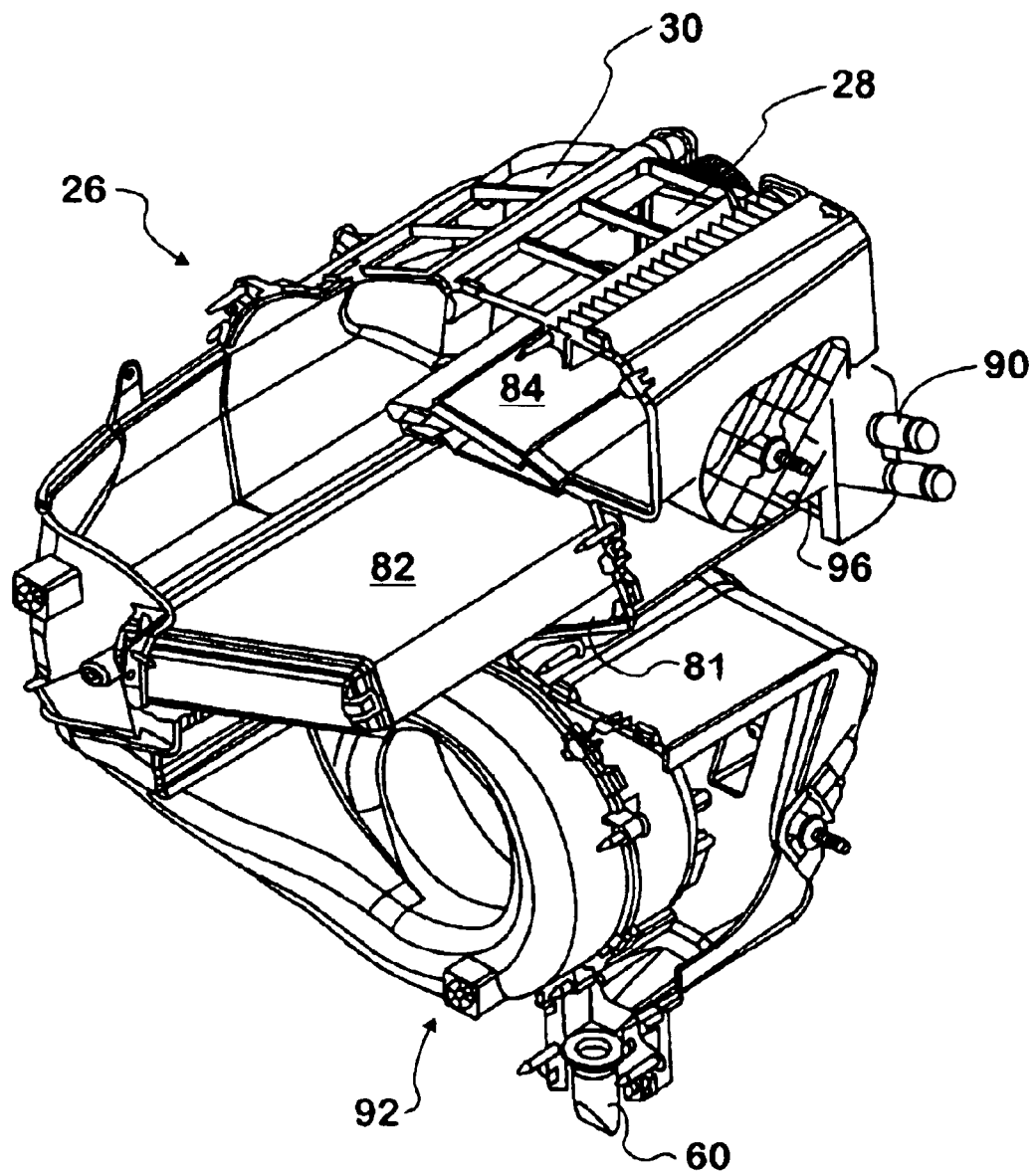
FIG. 5 is a perspective view of the heating or passenger compartment module of the preferred embodiment.

Referring now to FIG. 5, an alternative, perspective view in partial section of heater module 26 is shown. Heater core 82 connects to an engine coolant system by coolant circulation pipes 90, which extend through an opening in the dash panel 16. Recirculation air can escape manifold 84 back to the engine compartment module 22 by a vent 96. Heater core 82 rests in a slot 81 formed in part from the top of a blower/scroll subassembly 92.

Figure 6A:
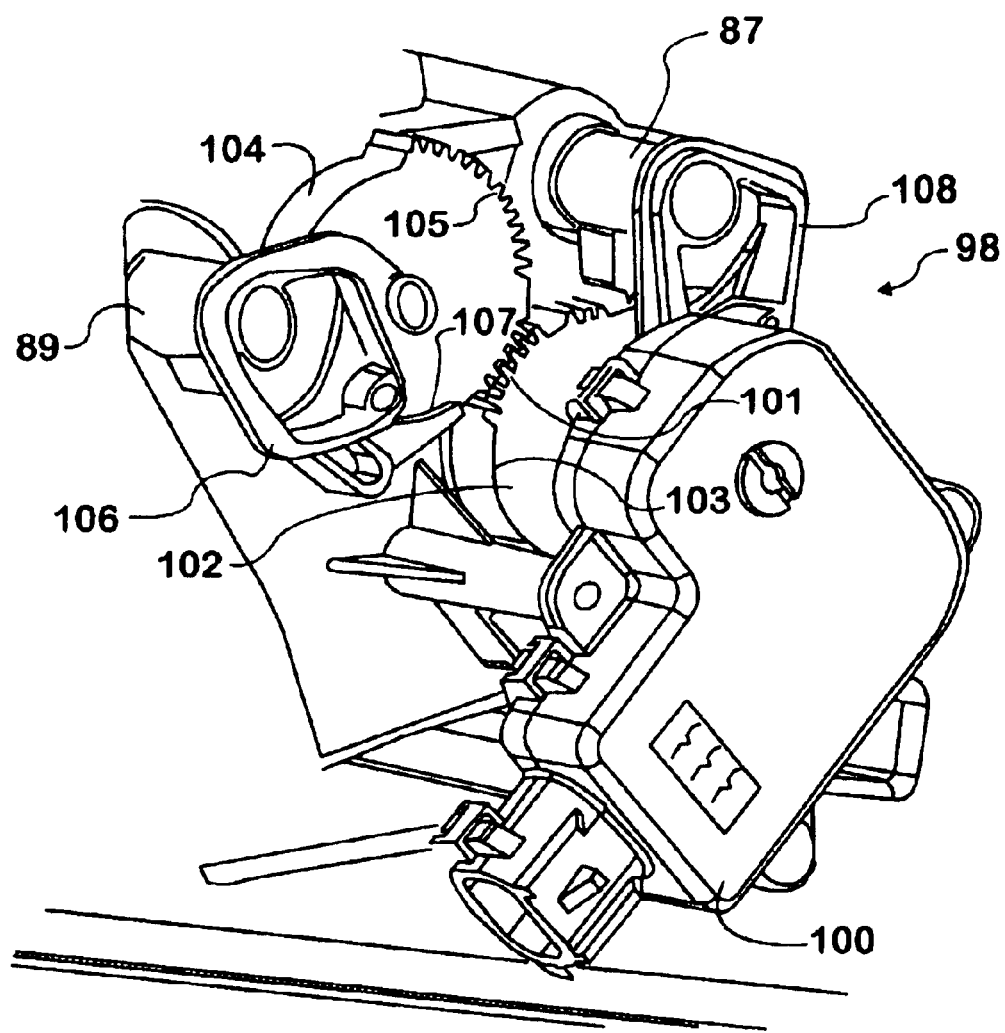
FIGS. 6A–B illustrate in perspective and elevation a kinematic movement for controlling the mode of the panel and defrost ventilation control doors in the preferred embodiment.
Figure 6B:
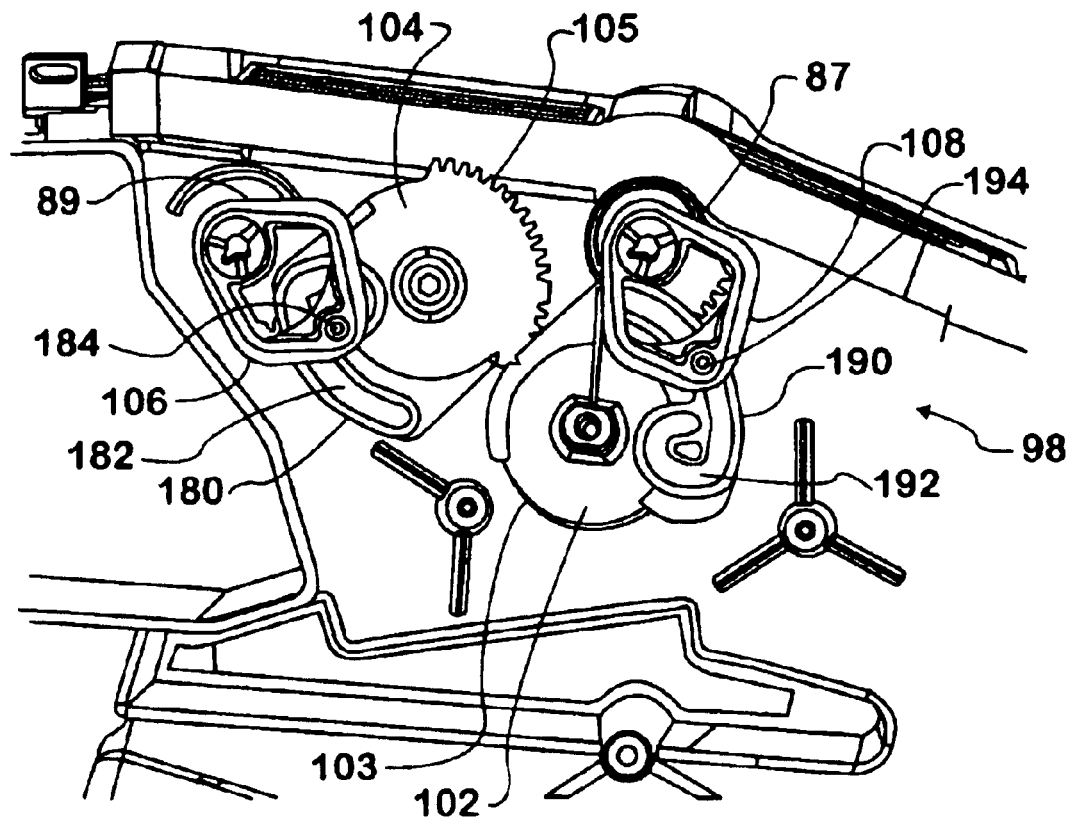

All air flow control doors, including recirculation control door 58, temperature blend control door 78, panel vent door 86 and defrost vent door 88, are positioned using pulse actuators, such as the pulse actuator 100 illustrated in FIG. 6A. A kinematic movement controlling the mode of each of the flow or ventilation doors is provided. A kinematic movement for vent door 30 and the defrost door 28 is illustrated as it is the most complex of the three systems provided. In the case of the temperature blend door and recirculation door, that portion of the system 98 depicted in FIGS. 6A–B used to position the vent door 86 suffices to effect position control. Accordingly, the kinematic movements controlling the recirculation door and temperature blend door are not described in detail. In all of the kinematic movements, a pinion gear directly or indirectly engages a cam follower, which is in turn attached to the axle on which a flow or ventilation door is mounted. FIGS. 6A-B are specifically directed to the kinematic arrangement 98 for the panel vent and defrost vent control doors 86 and 88, but are representative of the remaining, simpler kinematic mechanisms for the other doors. In FIG. 6B the pulse actuator 100 has been removed to more clearly illustrate gearing system.

Pulse actuator 100 turns a pinion gear 102 which includes, around its circumference, smooth regions 101 and toothed regions 103, which engage toothed regions of a following gear 104. Gear 102 has mounted thereto a grooved cam 190 with a cam groove 192 is formed. A cam follower 108 is coupled to the cam 190 by a pin 194 which extends into the groove 192. Cam follower 108 is attached to axle 87, so that as gear 102 rotates, and pin 194 tracks the moving groove 192, axle 87 rotates back and forth, resulting in the repositioning of vent door 86. Substantially identical arrangements provide for the positioning of the temperature blend control door 78 and the recirculation door 58.

Kinematic movement 98 is extended to provided coordinated control of the defrost door 88 with the panel vent door 86, thus requiring only one pulse actuator for the control of both doors. Control of the defrost door 88 depends from a gear 104, which engages pinion gear 102 along a portion of its circumference 105. A cam 180 with cam groove 182 depend from gear 104. A cam follower 106 includes a pin fitted into groove 182 so to move axle 89, which is attached to the cam follower 180. Axle 89 moves back and forth moving the defrost door 88 between closed and open positions following movement of the cam follower 106. By appropriate arrangement of the geared regions, and shape of the grooves 192 and 182, the movements of door 88 and door 86 are coordinated with one another so that the doors are appropriately positioned for ventilation of the cabin, directing air onto the windshield 32 or to the floor. Only one motor is required for coordinating the positioning of both doors. At engine start up the system is initialized to the last mode selected.

Figure 7:
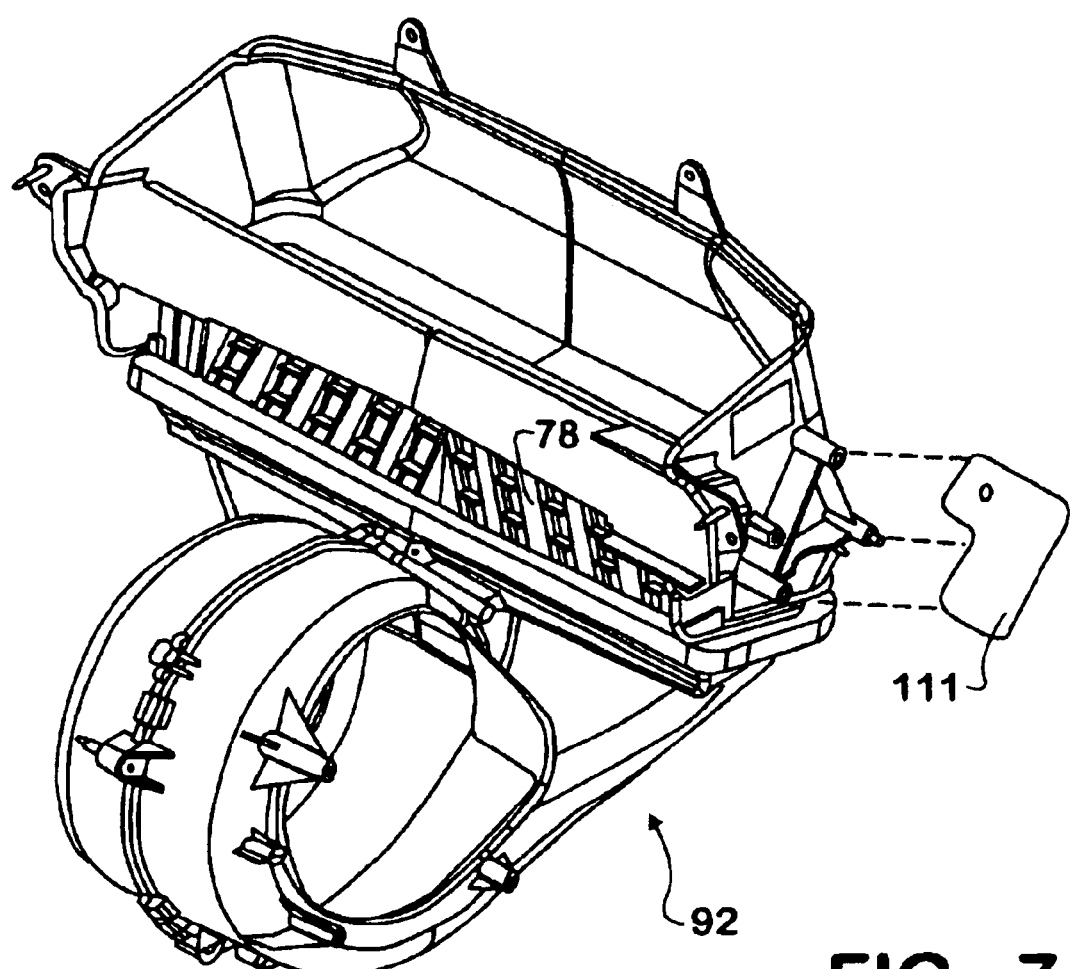
FIG. 7 is a perspective view of a blower and scroll assembly for a heater module.

FIG. 7 illustrates blower/scroll subassembly 92. A pulse actuator 111 may be positioned as indicated on the side of the assembly for connection to the pivot axle for temperature blend control door 78.

Figure 8:
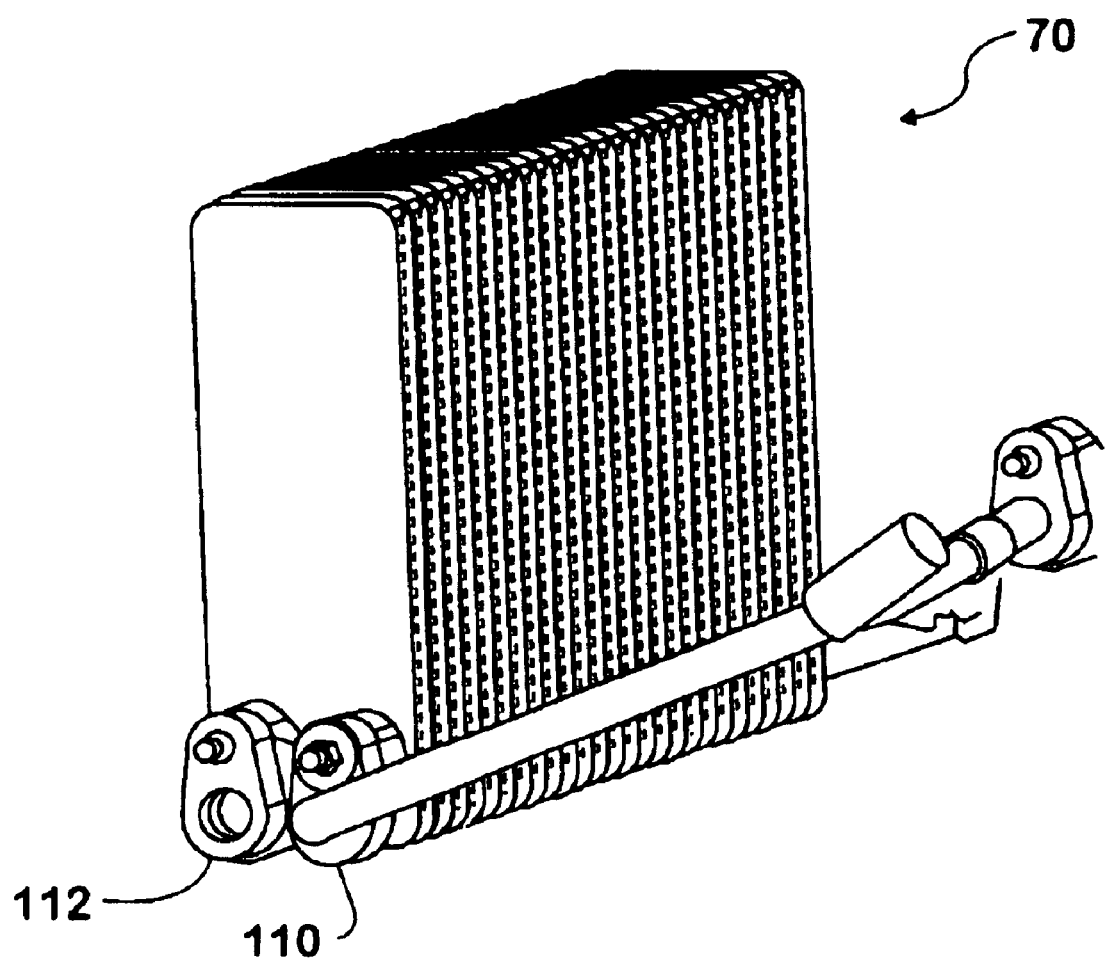
FIG. 8 is a perspective view of an evaporator.

FIG. 8 better illustrates an evaporator 70, which has a plate fin evaporator coil with block style fittings 110 and 112.

Figure 10:
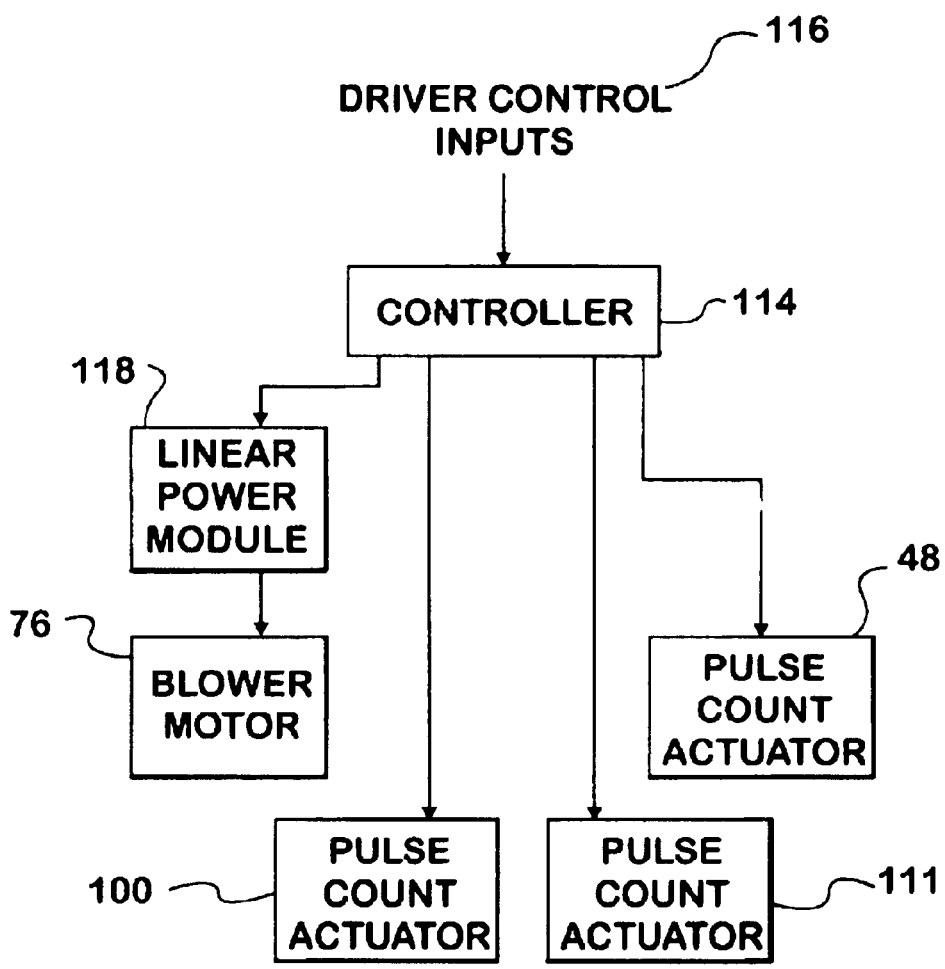
FIG. 10 illustrates a control arrangement for an HVAC system including driver controls.
Figure 9:
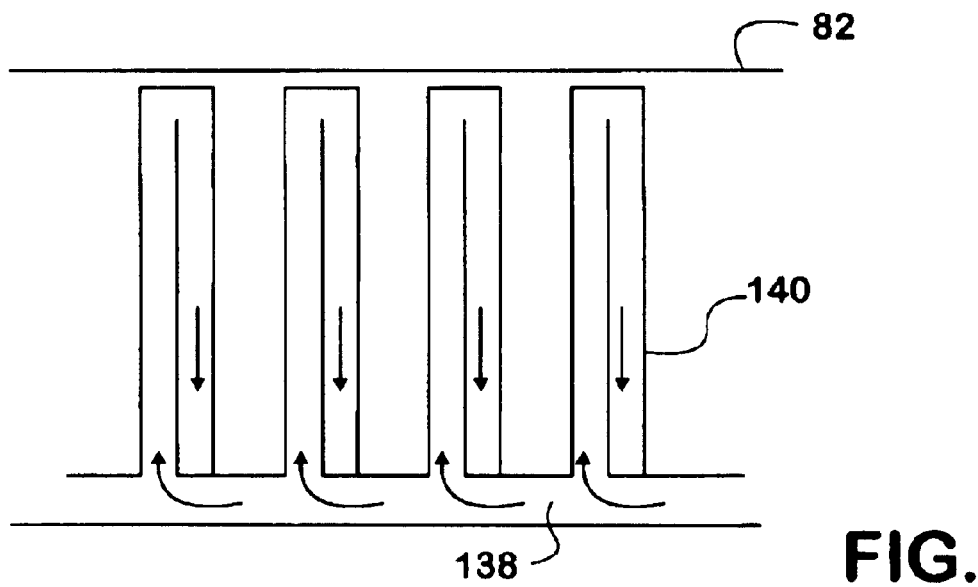
FIG. 9 is a control schematic for the heating, ventilation and air conditioning system.

FIG. 9 illustrates the coolant circulation in heater core 82. Coolant enters a manifold 138 from whence it is distributed among a plurality of tubes 140. Coolant circulates outwardly in the tubes and returns by return conduits which, are under the outward flow section, to a return manifold under manifold 138;

FIG. 10 illustrates a control arrangement for HVAC system 17, including driver controls 116. These controls may or may not include a cabin thermostat. Controller 114 output signals include a variable low voltage D.C. control signal to a linear power module 118, operating as a variable resistor, which in turn controls blower 76. Further control signals include outputs to pulse count actuator 100 for the vent and defrost control doors, to pulse count actuator 111 for the temperature blend control door and to pulse count actuator 48 for the recirculation control door. Depending upon the inputs provided by the driver and vehicle conditions, controller 114 determines the appropriate positions for each of the pulse actuators and the blower speed.

The invention provides a space efficient, widely applicable truck HVAC system, which is easily maintained and efficient. While the invention is shown in only one of its forms, it is not thus limited but is susceptible to various changes and modifications without departing from the spirit and scope of the invention.

What is claimed is:

1. A motor vehicle, comprising:

a passenger compartment;

an engine compartment;

a dash panel separating the passenger compartment from the engine compartment;

a heater module mounted to the dash panel in the passenger compartment, the heater module comprising a casing defining an inlet, a blower immediately downstream from the inlet, a scroll channel from the blower, a heater core plenum defined by the casing located for communication with the scroll channel, a heater core, the scroll channel further defining in part a slot for locating the heater core across the heater core plenum, sides of the slot and edges of the heater core respectively cooperating along abutting surfaces for retaining the heater core in the slot, a bypass around the heater core plenum, a temperature blend door arranged to pivot into and out of the scroll channel for directing air between the heater core plenum and the bypass, a manifold located following the heater core plenum and the bypass, a vent door and a defrost door positionable in the manifold; and an evaporator module mounted to the dash panel in the engine compartment, the evaporator module comprising a outside air inlet, a recirculation air inlet in communication with the return outlet of the heater module, a recirculation control door for controlling the proportion of air drawn through the recirculation inlet and the outside air inlet, an evaporator downstream from the recirculation control door, and outlet communicationg with the inlet to the heater module.

2. A motor vehicle as set forth in claim 1, wherein the heater module futher comprises:

a unified gear train and follower mechanism for coordinating control of the vent door and the defrost door; and a pulse count actuator motor coupled to drive the unified gear train and follower mechanism.

3. A motor vehicle as set forth in claim 2, wherein the pulse count actuator coupled to the unified gear train and follower mechanism is responsive to the motor vehicle being started to reset the vent door and the defrost door to a default position.

4. A motor vehicle as set forth in claim 3, wherein the heater module further comprises:

the temperature blend door being actuated by a temperature blend control pulse count actuator; and the temperature blend door including first and second flaps, which, when the door is positioned to close off the heater core from air flow, cover and inlet to and outlet from the heater core, respectively.

5. A motor vehicle as set forth in claim 4, wherein the evaporator module further comprises:

the recirculation door being actuated by a recirculation control pulse count actuator.

6. A motor vehicle as set forth in claim 1, the evaporator module futher comprising:

a first drain from the evaporator module for precipitation infiltrating the module and a second drain from the evaporator module for condensation of the evaporator.

7. A motor vehicle as set forth in claim 6, further comprising a low voltage controller for the blower motor.

8. A motor vehicle as set forth in claim 1, the dash panel providing openings on the right side and the left side for attachment of either the combination of the evaporator module and the heater module or steering column, with the combination of the evaporator module and heater module fitted on a selected one of either the left or the right side of the dash panel enclosing one of the openings.

* * * * *